G. M. EATON.
MOUNTING FOR DYNAMO ELECTRIC MACHINES.
APPLICATION FILED AUG. 7, 1914.
1,284,267.
Patented Nov. 12, 1918.
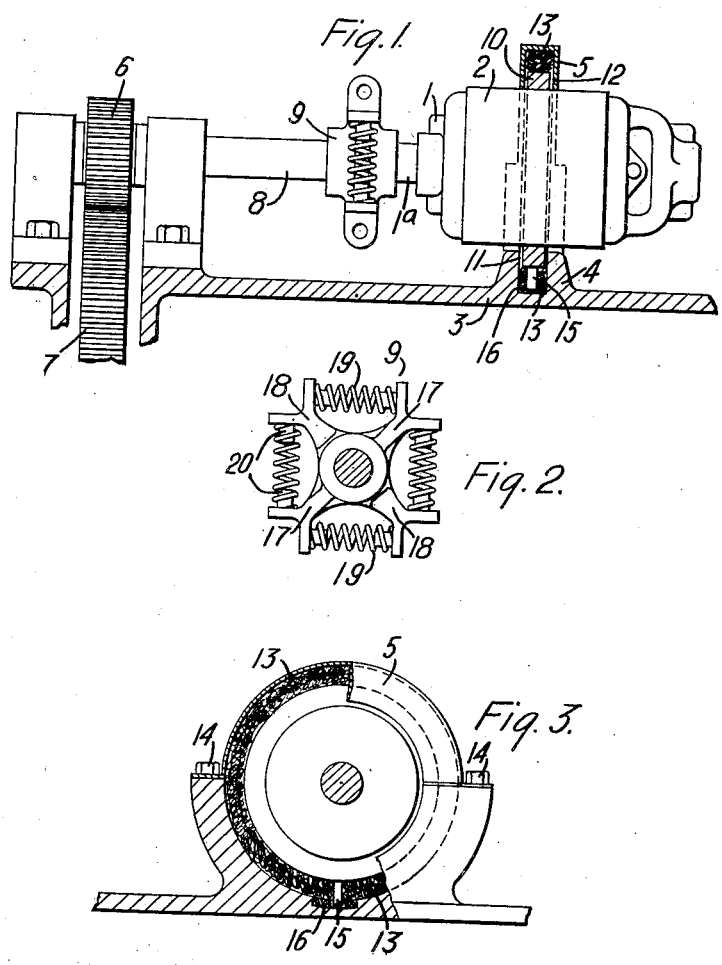
WITNESSES:
Fred A. Lind
W. R. Coley
INVENTOR
George M. Eaton
BY
[signature]
ATTORNEY

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

MOUNTING FOR DYNAMO-ELECTRIC MACHINES.

1,284,267.   Specification of Letters Patent.   Patented Nov. 12, 1918.

Application filed August 7, 1914. Serial No. 855,585.

*To all whom it may concern:*

Be it known that I, GEORGE M. EATON, a citizen of the United States, and a resident of Pittsburgh, in the county of Allegheny and State of Pennsylvania, have invented a new and useful Improvement in Mountings for Dynamo-Electric Machines, of which the following is a specification.

My invention relates to dynamo-electric machines, and it has special reference to means for supporting or mounting such machines.

The object of my invention is to provide a relatively simple and inexpensive means of the above-indicated character, which shall allow considerable flexibility in the mounting of the stationary parts of a dynamo-electric machine, which is mechanically associated with power-transmitting means, whereby inaccuracies in alinement, or undesirable mechanical conditions caused by the operation of the system, will be readily compensated for so that no parts of the apparatus will be subjected to injurious strains.

More specifically stated, the object of my invention is to provide a simple, compact and durable means for permitting substantially universal movement of the stationary element of a dynamo-electric machine relative to its fixed base member.

With the above ends in view, I provide a dynamo-electric machine with a yieldingly-mounted stationary element which insures the universal movement above referred to.

In the accompanying drawing, Figure 1 is a view, partially in side elevation and partially in section, of an apparatus constructed in accordance with my invention; Fig. 2 is a view taken at right angles to the view of Fig. 1, and illustrates a portion of the apparatus therein shown; and Fig. 3 is a view, partially in end elevation and partially in section, of the dynamo-electric machine illustrated in Fig. 1.

Referring to the drawing, the apparatus here shown comprises a dynamo-electric machine of any suitable type having a rotatable element or armature 1 that is provided with a shaft 1ª and a coöperating inclosing stationary element 2; a fixed base member 3 that is provided with a cradle 4 which is adapted to support the stationary element 2 and extends substantially half way up the sides thereof, a complementary annular cap 5 extending over the upper half of the stationary element; and power transmitting means, such as a pinion 6 and a gear 7, connected to the shaft 1ª of the rotatable element 1 by means of a shaft 8 and a flexible coupling 9. A ring member 10 encircles the stationary element 2, is rigidly secured thereto and is adapted to be disposed within a ring-receiving groove 11 in the cradle 4 and a corresponding groove 12 in the cap 5. The spaces between the ring 10 and its inclosing members are filled with a suitable yielding material, such as felt 13. The cap 5 may be secured to the cradle 4 in any suitable manner, as by bolts 14.

The grooves 11 and 12 are of slightly larger size than the ring 10, thereby permitting a substantially universal movement of the ring 10 and the associated stationary element 2, within predetermined limits. It should be noted that the capacity of the dynamo-electric machine, in many cases, is sufficiently small to obviate the possibility of the machine torque overcoming the friction between the ring 10 and the material 13 and thereby causing the rotation of the stationary element 2. Where the proportions are such that it is not safe to rely on friction to prevent rotation of the stationary element, a suitable restraining means, such as a cushioned stop 15, which will not interfere with the degree of universal movement desired may readily be provided by the application of ordinary mechanical skill. The stop 15 is secured to the under surface of the ring 10 and is adapted to rest within a slot or recess 16 in the frame 3, which recess may be filled with felt 13, or other suitable cushioning material, or the ring 10 could obviously be made partially annular in form and the cap 5 used to retain the interposed felt 13 in place, in which case no stop 15 would be required.

Reference may now be had to Fig. 2, which illustrates a well known type of flexible coupling that comprises a pair of diametrically extending arms 17 and 18 which are normally disposed substantially at right angles to each other, and suitable helical springs 19 which are respectively associated with projections 20 on the adjacent ends of the arms, for permitting a resilient driving connection between the shafts 1ª and 8. It will be appreciated that the universal movement of the stationary element 2 is more effectively utilized through the provision of the flexible coupling. During the time that the machine is not in operation, the principal axis of the element 2 is disposed in a neutral position, but during the operation this element, being yieldingly supported on its base, may assume a coaxial position with respect to the power-transmitting means, in which position its principal axis coincides with the axis of rotation of element 1 and is disposed in a plane containing the neutral axis but will intersect the latter. The axis of the machine may swing thus in any direction from its neutral position, i. e., into any plane containing the neutral axis.

Although I have shown and described my invention in a more or less specific form, it will be understood that the application thereof is not limited to any particular class of work, and modifications thereof may be made within the spirit and scope of my invention. I, therefore, desire that only such limitations shall be imposed as are indicated in the appended claims.

I claim as my invention:

1. The combination with a dynamo-electric machine having a movable and a coöperating relatively stationary element, of supporting means surrounding the stationary element, and yielding means interposed between the supporting means and the stationary element for frictionally engaging the said element and for automatically permitting predetermined movement of the stationary element relative to the said supporting means.

2. The combination with a dynamo-electric machine having coöperating elements, of power-transmitting means operatively connected to one of said elements, and means for so supporting the other element that, in case of misalinement of said elements and the power-transmitting means, said elements may assume a position in which said elements and the power-transmitting means are substantially coaxial.

3. The combination with a machine having a movable and a coöperating relatively stationary element, of a base, a member secured to the base and surrounding the stationary element, and yielding means interposed between the member and the stationary element for restraining movements of said stationary element.

4. The combination with a dynamo-electric machine having a rotor and a stator, of supporting means for frictionally engaging the said stator and adapted to permit a relatively small amount of universal movement of the said stator during the operation of the machine.

5. The combination with a dynamo-electric machine having a movable and a coöperating relatively stationary element, and power-transmitting means mechanically associated with the machine, of an annular member encircling said stationary element, a base member, and means interposed between said base and said stationary element for yieldingly receiving said annular member and adapted to permit of a predetermined degree of universal movement of the stationary element.

6. The combination with a dynamo-electric machine having a movable and a coöperating relatively stationary element, and power-transmitting means mechanically associated with the machine, of a member encircling said stationary element, a base adapted to receive a portion of said member, a curved member secured to said base for receiving another portion of the first named member and yielding means interposed between said first named member and its inclosing members.

7. The combination with a dynamo-electric machine having a movable and a coöperating relatively stationary element, and power-transmitting means mechanically associated with the machine, of a flexible coupling operatively connecting said movable element and said power transmitting means, a ring member encircling said stationary element, a fixed base member having a groove of slightly larger size than the ring member for receiving substantially the lower half of said member, a grooved cap member secured to said base member and inclosing the remaining portion of said ring member, and yielding material interposed between said ring member and its inclosing members, whereby said stationary element is adapted to automatically utilize a predetermined amount of universal movement during machine operation.

8. The combination with a dynamo-electric machine having a rotatable element and a stationary element, power-transmitting means mechanically associated with the machine, and a base member, of supporting means for the machine adapted to permit a predetermined amount of universal movement of said stationary element relative to said base member, and means associated with said stationary element and said base member for preventing actual rotative movement of the stationary element.

9. The combination with a dynamo-electric machine having a rotor and a stator, and power-transmitting means mechanically associated with the rotor, of a ring member encircling said stator, a base member for receiving a portion of the ring member, a curved member secured to said base member for similarly receiving another portion of the ring member, yielding means interposed between said ring member and its inclosing members, and means engaging said ring member and one of said inclosing members for preventing rotative movement of the ring member.

10. The combination with a dynamo-electric machine comprising a rotor and a stator, of a base, a grooved supporting member secured to said base and adapted to embrace substantially the lower half of said stator, resilient material disposed in said groove and frictionally engaging said stator, and a cap secured to said supporting member and encircling the remaining portion of said stator, said stator adapted to have a predetermined degree of movement relative to said supporting member.

11. The combination with a dynamo-electric machine comprising a rotatable element and a relatively stationary element coöperating therewith, of power-transmitting means operatively connected to said rotatable element, and yielding means for supporting said stationary element with its principal axis normally disposed in a neutral position but so that, in case of misalinement of said elements and the power-transmitting means, the principal axis of said stationary element may swing to intersect the neutral axis in any plane containing the latter, whereby said machine automatically alines and becomes coaxial with said power-transmitting means.

12. The combination with a dynamo-electric machine comprising a rotatable element and a relatively stationary coöperating element, of power-transmitting means, a yielding connection between said rotatable element and said power-transmitting means, a base, and means for supporting said stationary element upon said base with its principal axis normally disposed in a neutral position, said supporting means comprising a yieldable device which, in case of misalinement of said elements and the power-transmitting means, will permit said principal axis of the stationary element to swing about a point therein and intersect the fixed neutral axis in any plane containing the latter, whereby said power-transmitting means and machine automatically aline and become coaxial.

In testimony whereof, I have hereunto subscribed my name this 31st day of July 1914.

GEORGE M. EATON.

Witnesses:
  G. R. IRWIN,
  B. B. HINES.